United States Patent
Shinoda et al.

(10) Patent No.: US 9,746,989 B2
(45) Date of Patent: Aug. 29, 2017

(54) THREE-DIMENSIONAL IMAGE PROCESSING APPARATUS

(71) Applicants: Kensuke Shinoda, Otawara (JP); Kyoko Sato, Nasushiobara (JP); Satoshi Wakai, Nasushiobara (JP); Tomohisa Fukunaga, Nasushiobara (JP)

(72) Inventors: Kensuke Shinoda, Otawara (JP); Kyoko Sato, Nasushiobara (JP); Satoshi Wakai, Nasushiobara (JP); Tomohisa Fukunaga, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 4 days.

(21) Appl. No.: 13/647,647

(22) Filed: Oct. 9, 2012

(65) Prior Publication Data
US 2013/0093763 A1  Apr. 18, 2013

(30) Foreign Application Priority Data
Oct. 13, 2011 (JP) .................................. 2011-225499

(51) Int. Cl.
*G06F 3/0484* (2013.01)
*G06F 3/0481* (2013.01)
(Continued)

(52) U.S. Cl.
CPC ........ *G06F 3/04815* (2013.01); *G06F 3/0484* (2013.01); *G06T 15/20* (2013.01); *G06T 19/00* (2013.01); *H04N 13/0275* (2013.01)

(58) Field of Classification Search
CPC ........................... G06F 3/0484; H04N 13/0275
(Continued)

(56) References Cited

U.S. PATENT DOCUMENTS 6,023,275 A * 2/2000 Horvitz ............... G06F 3/04815
715/700
6,225,979 B1 * 5/2001 Taima et al. .................. 345/157
(Continued)

FOREIGN PATENT DOCUMENTS

CN 101627349 A 1/2010
JP 2001-149366 6/2001
(Continued)

OTHER PUBLICATIONS

Combined Office Action and Search Report issued Mar. 27, 2015 in Chinese Patent Application No. 201210387093.9 (with English language Translation of Category of Cited Documents).
(Continued)

*Primary Examiner* — Gregory J Tryder
*Assistant Examiner* — Jitesh Patel
(74) *Attorney, Agent, or Firm* — Oblon, McClelland, Maier & Neustadt, L.L.P.

(57) ABSTRACT

According to one embodiment, a three-dimensional image processing apparatus includes at least a storage, an inputting unit, an image generating unit and a pointer controlling unit. The storage stores volume data of a target. The inputting unit receives an input operation for moving a pointer. The image generating unit generates a superimposed image in which a rendering image generated by performing a rendering process on the volume data and a pointer image are superimposed in consideration of information of depth. The pointer controlling unit obtains information of a three-dimensional position of the pointer. When the pointer is on the rendering image, the pointer controlling unit moves the pointer along a three-dimensional surface of a target contained in the volume data.

20 Claims, 8 Drawing Sheets

(51) Int. Cl.
*G06T 15/20* (2011.01)
*G06T 19/00* (2011.01)
*H04N 13/02* (2006.01)

(58) Field of Classification Search
USPC .......................................................... 345/419
See application file for complete search history.

(56) References Cited

U.S. PATENT DOCUMENTS

| | | | |
|---|---|---|---|
| 6,243,096 B1* | 6/2001 | Takanashi | 345/419 |
| 6,515,277 B1* | 2/2003 | Kley | 250/234 |
| 7,043,701 B2* | 5/2006 | Gordon | G06F 3/04815 |
| | | | 715/757 |
| 2002/0163543 A1 | 11/2002 | Oshikiri | |
| 2004/0171413 A1* | 9/2004 | Charpentier | 463/9 |
| 2006/0236251 A1* | 10/2006 | Kataoka | G06F 3/0481 |
| | | | 715/757 |
| 2007/0182730 A1* | 8/2007 | Mashitani | G06T 15/10 |
| | | | 345/419 |
| 2009/0303256 A1* | 12/2009 | Paquette | G06F 3/04812 |
| | | | 345/661 |
| 2010/0033429 A1* | 2/2010 | Olivan Bescos | 345/157 |
| 2010/0050117 A1* | 2/2010 | Sherrard et al. | 715/810 |
| 2010/0201683 A1* | 8/2010 | Shirahata et al. | 345/420 |
| 2011/0107270 A1* | 5/2011 | Wang et al. | 715/850 |
| 2011/0122234 A1* | 5/2011 | Kikkawa | G06T 7/0022 |
| | | | 348/51 |
| 2012/0013607 A1* | 1/2012 | Lee | G06T 15/20 |
| | | | 345/419 |
| 2012/0013613 A1* | 1/2012 | Vesely | G06F 3/011 |
| | | | 345/419 |
| 2012/0015316 A1* | 1/2012 | Sachdeva et al. | 433/24 |
| 2012/0032950 A1* | 2/2012 | Lee | G06T 15/00 |
| | | | 345/419 |
| 2012/0069159 A1* | 3/2012 | Matsui | G06F 3/04815 |
| | | | 348/51 |

FOREIGN PATENT DOCUMENTS

| | | |
|---|---|---|
| JP | 2003-216295 | 7/2003 |
| JP | 2006-309459 | 11/2006 |
| JP | 2007-275558 | 10/2007 |
| JP | 2011-36496 | 2/2011 |

OTHER PUBLICATIONS

"Establishment of spatial topological relation", Wanfang Data, IIE 124438, (Apr. 29, 2007), 11 pages (with partial English language translation).

Japanese Office Action dated Jul. 19, 2016, issued in Japanese Patent Application No. 2012-226237 (with partial English translation).

* cited by examiner

Z-AXIS DIRECTION
(DEPTH DIRECTION)

STEREOSCOPIC VIEW

THREE-DIMENSIONAL IMAGE PROCESSING APPARATUS

CROSS-REFERENCE TO RELATED APPLICATIONS

This application claims the benefit of priority of Japanese Patent Application No. 2011-225499, filed Oct. 13, 2011, the entire contents of which are incorporated herein by reference.

FIELD

Embodiments described herein relate generally to a three-dimensional image processing apparatus.

BACKGROUND

Some medical diagnostic imaging apparatuses (modalities) such as an X-ray computed tomography (CT) apparatus, a magnetic resonance imaging (MRI) apparatus, an ultrasound diagnostic apparatus, and an X-ray diagnostic apparatus can generate volume data (three-dimensional image data) on the basis of projection data obtained by picking up an image of an object (patient).

The volume data can be used to generate a two-dimensional image (hereinafter referred to as VR image) by volume rendering. The VR image is displayed on a display apparatus to be presented to a user.

Recently, 3D displays that enable a user to recognize a stereoscopic image have started to appear on the market. The 3D displays of this type emit a plurality of parallax component images in different directions. The user can recognize the stereoscopic image as an aggregation of the parallax component images.

Accordingly, VR images are generated by subjecting volume data to volume rendering at different rendering points of view, and the VR images at the plurality of points of view are given to a 3D display as parallax component images, whereby a stereoscopic image corresponding to the volume data can be displayed on the 3D display. A user who looks at the stereoscopic image of this type can recognize a depth direction of the stereoscopic image. Further, the user can recognize a depth direction of even one VR image if shading and texture mapping are performed thereon.

However, it is difficult to move a pointer such as a mouse cursor in a depth direction on a screen. This is because conventional pointers are designed to move two-dimensionally on the screen and movement of the pointers in the depth direction is not taken into consideration in the first place. Accordingly, for example, if a plurality of images are displayed in a superimposed manner in the depth direction, it is difficult to move the pointer between these images.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinbelow, a description will be given of a three-dimensional image processing apparatus according to an embodiment of the present invention with reference to the drawings.

In general, according to one embodiment, the three-dimensional image processing apparatus includes a storage, an inputting unit, an image generating unit and a pointer controlling unit. The storage stores volume data of a target. The inputting unit receives an input operation for moving a pointer. The image generating unit generates a superimposed image in which a rendering image generated by performing a rendering process on the volume data and a pointer image are superimposed in consideration of information of depth. The pointer controlling unit obtains information of a three-dimensional position of the pointer. When the pointer is on the rendering image, the pointer controlling unit moves the pointer along a three-dimensional surface of a target contained in the volume data.

Figure 1:
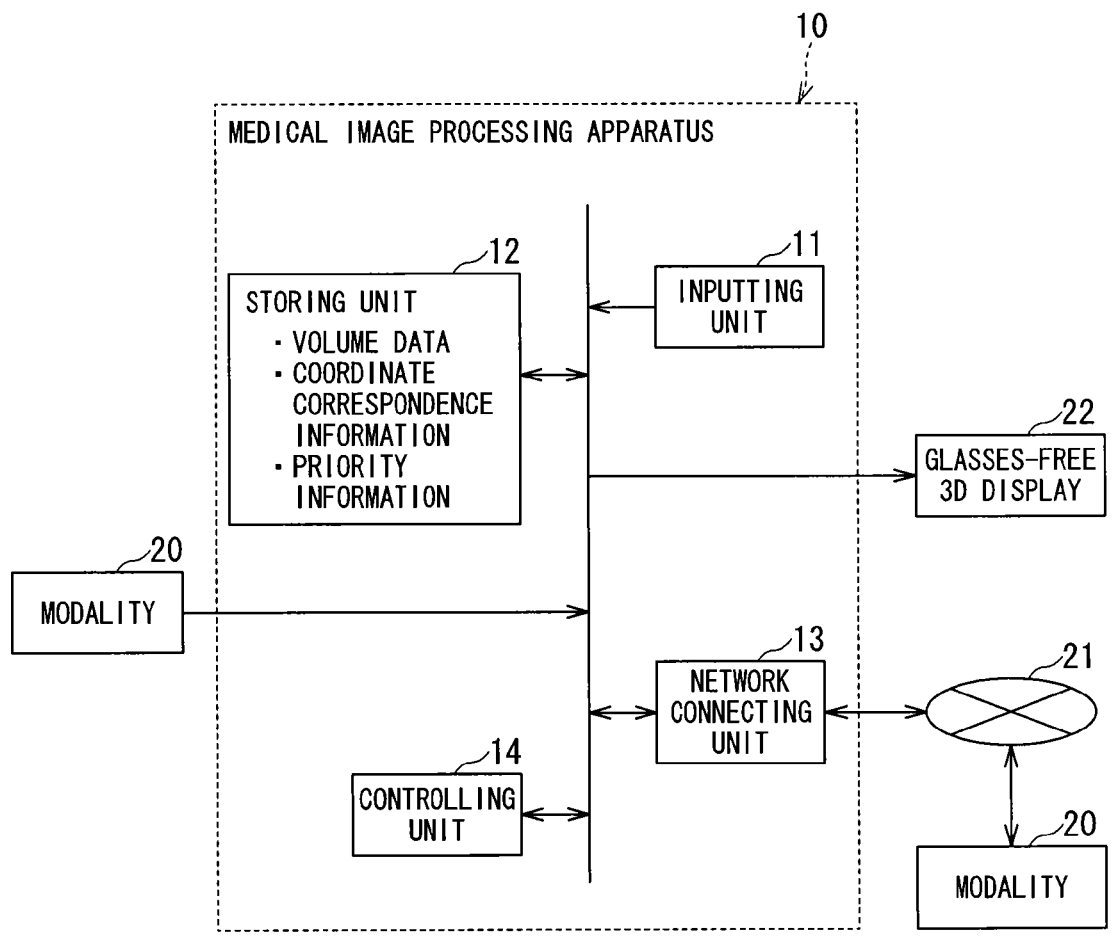
FIG. 1 is a block diagram illustrating a configuration example of a medical image processing apparatus according to the embodiment of the present invention.

FIG. 1 is a block diagram illustrating a configuration example of a medical image processing apparatus 10 according to the embodiment of the present invention.

As illustrated in FIG. 1, the medical image processing apparatus 10 as a three-dimensional image processing apparatus includes an inputting unit 11, a storing unit 12, a network connecting unit 13, and a controlling unit 14.

The inputting unit 11 includes at least a pointing device, is configured by general input devices such as a mouse, a trackball, a keyboard, a touch panel, and a numeric keypad, and outputs an operation input signal corresponding to an operation of the user to the controlling unit 14.

The storing unit 12 stores medical volume data (three-dimensional image data) outputted by a modality 20. Examples of the modality 20 include medical diagnostic imaging apparatuses such as an X-ray computed tomography (CT) apparatus, a magnetic resonance imaging (MRI) apparatus, an ultrasound diagnostic apparatus, and an X-ray diagnostic apparatus. The modality 20 can be configured by an apparatus that can generate volume data (three-dimensional image data) on the basis of projection data obtained by picking up an image of an object (patient).

The storing unit 12 further stores coordinate correspondence information in which three-dimensional coordinates of volume data are associated with two-dimensional coordinates of a VR image. The coordinate correspondence information is written into the storing unit 12, for example, when the controlling unit 14 generates the VR image on the basis of the volume data.

The storing unit 12 further stores pieces of information on respective degrees of priority (hereinafter referred to as priority information) of a plurality of images that are superimposed in a depth direction (direction of the depth) on one screen presented to the user. The priority information may be set in advance as factory defaults, or may be set by the user through the inputting unit 11.

Note that the plurality of images that are superimposed in the depth direction on one screen may include a plurality of VR images. Examples of the plurality of VR images include VR images that are segmented (classified) depending on, for example, types such as muscles, bones, blood vessels, and organs on the basis of volume data obtained from one object. It is advisable that the plurality of segmented VR images be superimposed such that a spatial position relation between the VR images is reproduced, instead of simply putting layers thereof on top of each other in the depth direction.

The network connecting unit 13 has various protocols for information communication mounted thereon, the protocols being in conformity to a mode of a network 21. The network connecting unit 13 connects the medical image processing apparatus 10 to other apparatuses such as the modality 20 according to the various protocols. Note that the network 21 refers to overall information and communication networks using telecommunications technology, and includes wireless/wired local area networks (LAN) such as a hospital core LAN, Internet networks, telephone communication networks, optical fiber communication networks, cable communication networks, and satellite communication networks.

The medical image processing apparatus 10 may receive volume data from the modality 20 connected thereto via the network 21. The volume data received via the network 21 is also stored into the storing unit 12. Similarly, the medical image processing apparatus 10 may receive, via the network 21, information such as the coordinate correspondence information and the priority information to be stored into the storing unit 12.

The controlling unit 14 is configured by storage media typified by a CPU, a RAM, and a ROM, and controls a processing operation of the medical image processing apparatus 10 according to programs stored in the storage media.

Figure 2:
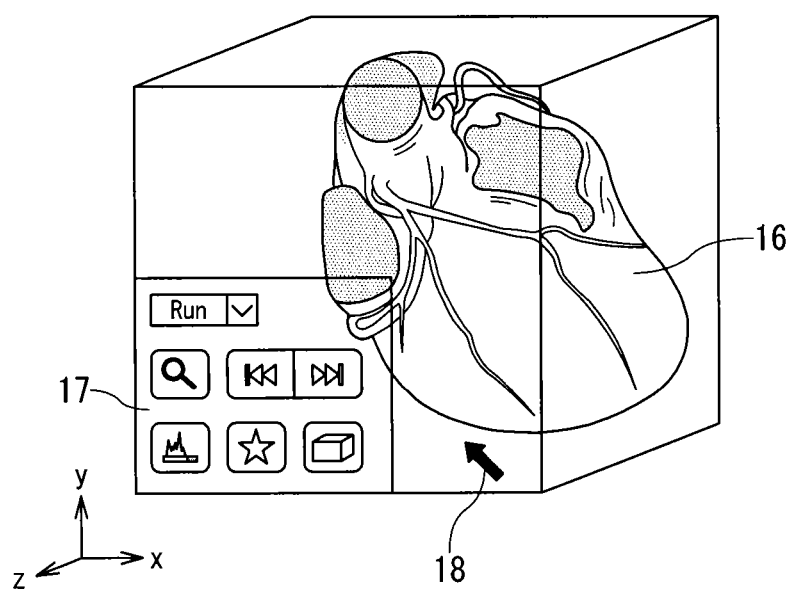
FIG. 2 is an explanatory view illustrating an example of the state where a plurality of images are superimposed in the depth direction on one screen presented to the user.

FIG. 2 is an explanatory view illustrating an example of the state where a plurality of images are superimposed in the depth direction on one screen presented to the user. Note that, in the following description, a lower left point of a front side of the screen is defined as an origin of coordinates, a right side from the origin in a horizontal direction is defined as an X-axis positive direction, an upper side therefrom in a vertical direction is defined as a Y-axis positive direction, and a front side therefrom is defined as a Z-axis positive direction, whereby the X-, Y-, and Z-axes are defined. At this time, the Z-axis direction corresponds to the depth direction.

Note that FIG. 2 illustrates an example of the state where one VR image 16 is superimposed, but a plurality of VR images 16 (segmented VR images 16) may be superimposed. In the present embodiment, description is given of an example as illustrated in FIG. 2 where one VR image 16 is superimposed.

As illustrated in FIG. 2, the VR image 16 may be displayed on the screen in some cases so as to be superimposed on the auxiliary image 17 one behind another in the depth direction. For the X and Y coordinates, the pointer 18 can be moved to a desired position of the user in response to an operation of the user through the inputting unit 11, whereas, for the depth direction (Z-axis direction), the pointer 18 cannot be freely moved by an operation through the inputting unit 11 in some cases. In such cases, it is difficult to place the pointer 18 over a desired image of the plurality of images superimposed in the depth direction on the screen. Further, for example, even in the case where the inputting unit 11 is configured by a mouse with a wheel and where movement of a position in the depth direction of the pointer 18 is possible in accordance with rotations of the wheel, it is difficult to understand the position in the depth direction of the pointer 18, and it is still difficult to place the pointer 18 over a desired image of the plurality of images superimposed in the depth direction on the screen.

In view of the above, the CPU of the controlling unit 14 loads, onto the RAM, a three-dimensional image processing program and data necessary to execute this program, which are stored in the storage media typified by the ROM, and executes a process of moving the pointer 18 between the plurality of images that are displayed in a superimposed manner in the depth direction, according to this program.

The RAM of the controlling unit 14 provides a work area that temporarily stores programs to be executed by the CPU and data therefor. Further, the storage media typified by the ROM of the controlling unit 14 store an activation program for the medical image processing apparatus 10, the three-dimensional image processing program, and various pieces of data necessary to execute these programs.

Note that the storage media typified by the ROM include a magnetic or optical recording medium or a recording medium readable by the CPU, such as a semiconductor memory, and the entirety or a part of programs and data stored in these storage media may be downloaded via the network 21.

The controlling unit 14 generates an image (a plurality of viewpoint images, a multi-viewpoint image) in which the VR images 16 observed at a plurality of points of view and the auxiliary image 17 are superimposed in the depth direction, and outputs the generated image to a glasses-free 3D display 22.

Figure 3:
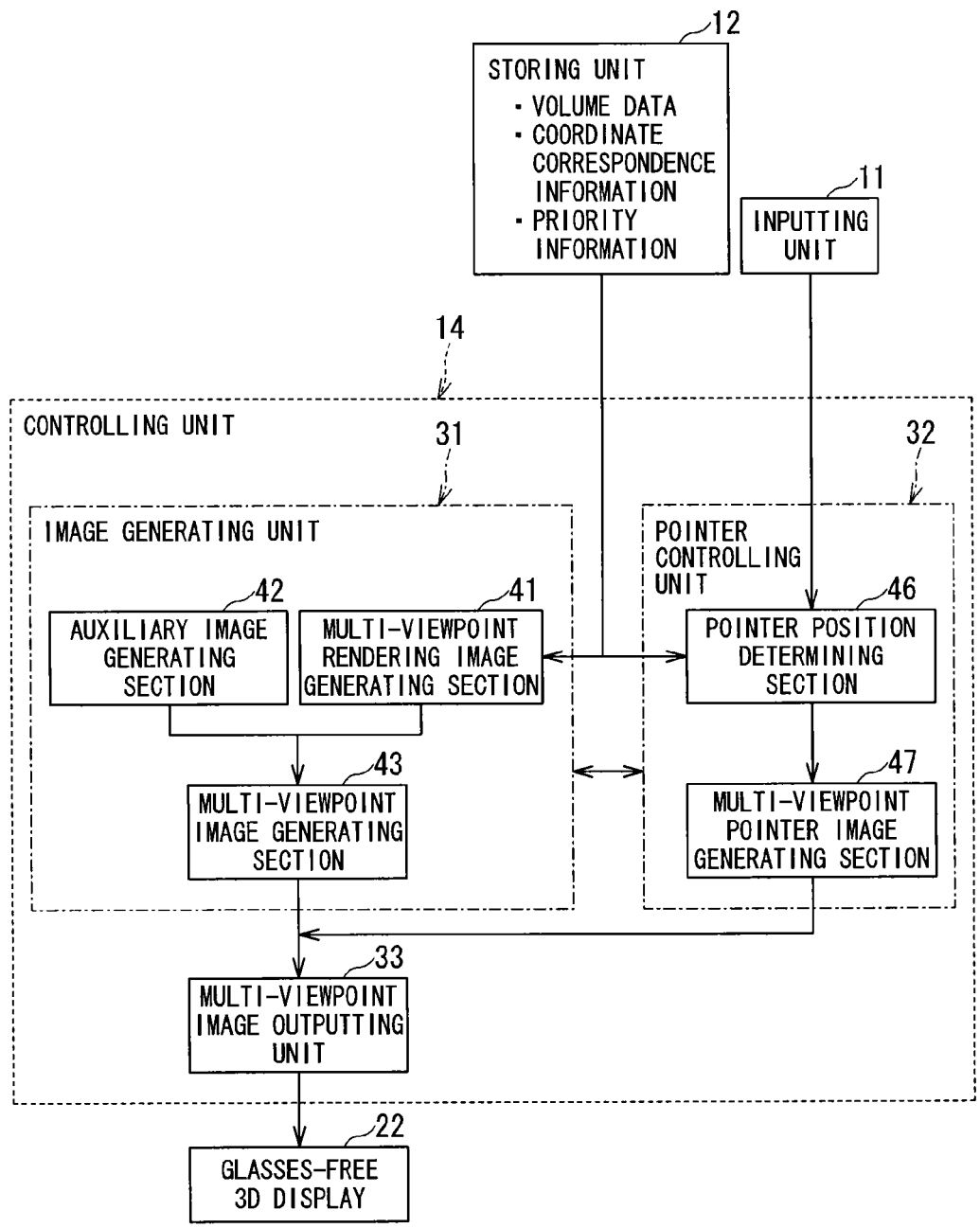
FIG. 3 is a schematic block diagram illustrating a configuration example of a function implementing unit of the CPU of the controlling unit.

FIG. 3 is a schematic block diagram illustrating a configuration example of a function implementing unit of the CPU of the controlling unit 14. Note that the function implementing unit may be configured by hardware logic of a circuit and the like, instead of using the CPU.

As illustrated in FIG. 3, the CPU of the controlling unit 14 functions as an image generating unit 31, a pointer controlling unit 32, and a multi-viewpoint image outputting unit 33, according to the three-dimensional image processing program. The units 31 to 33 each use a given work area of the RAM as a temporal storage place of data.

The image generating unit 31 includes a multi-viewpoint rendering image generating section 41, an auxiliary image generating section 42, and a multi-viewpoint image generating section 43.

The multi-viewpoint rendering image generating section 41 performs volume rendering at a plurality of points of view on the basis of volume data stored in the storing unit 12, to thereby generate the VR image 16 at each point of view (a viewpoint rendering image; hereinafter referred to as a viewpoint VR image).

Figure 4:
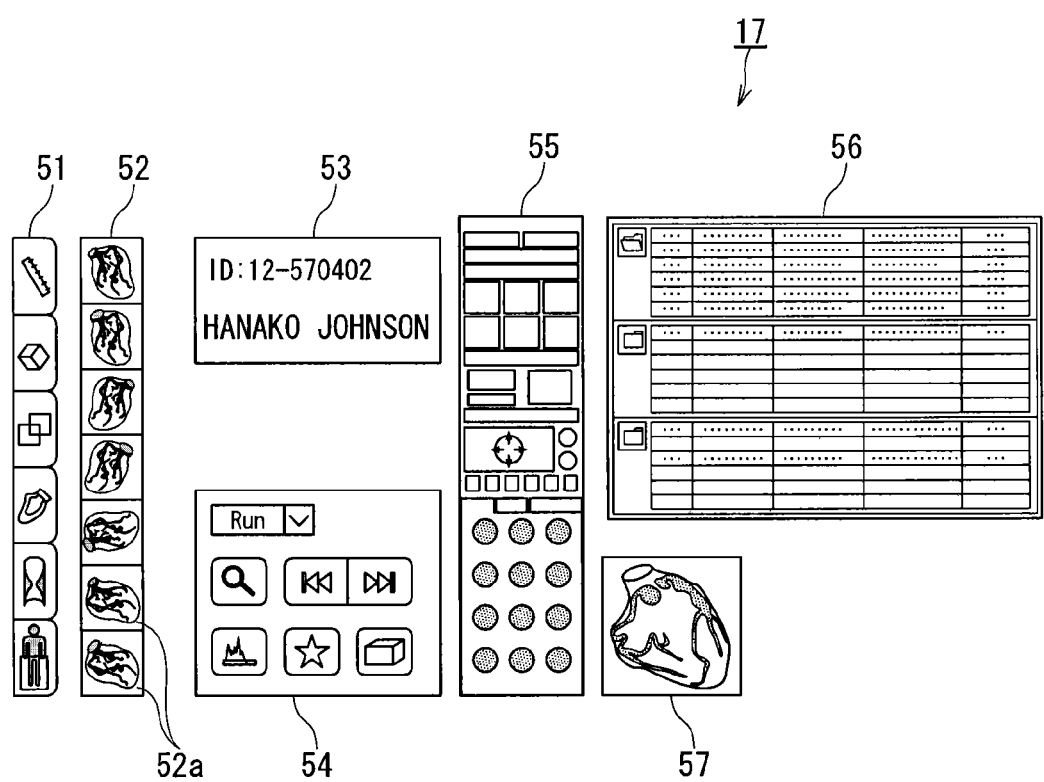
FIG. 4 is an explanatory view illustrating an example of auxiliary image elements constituting the auxiliary image.

FIG. 4 is an explanatory view illustrating an example of auxiliary image elements constituting the auxiliary image 17.

The auxiliary image 17 is configured by the auxiliary image elements including: a toolbar 51 to which various functions are assigned and which is configured by a plurality of soft keys; a thumbnail image group 52 configured by a plurality of thumbnail images 52a; a related information display image 53; a basic operation panel 54; an operation panel 55; lists 56 of patients, series, and images; and an image 57 different from the viewpoint VR image. Examples of the image 57 different from the viewpoint VR image include: a VR image obtained by volume rendering in a rendering mode different from that of the viewpoint VR image; and an image the volume data of which is different from that of the viewpoint VR image. FIG. 2 illustrates an example of the case where the auxiliary image 17 is configured by only the basic operation panel 54.

The auxiliary image generating section 42 generates the auxiliary image 17 configured by one or more elements of the auxiliary image elements.

The multi-viewpoint image generating section 43 generates a plurality of viewpoint superimposed images (multi-viewpoint superimposed image) in which the VR image (viewpoint VR image) 16 generated by the multi-viewpoint rendering image generating section 41 is superimposed in the depth direction on the auxiliary image 17 generated by the auxiliary image generating section 42. Note that an image file that serves as a base for each auxiliary image element may be stored in advance in the storing unit 12, or may be acquired as appropriate via the network 21.

Note that, when the multi-viewpoint image generating section 43 superimposes the viewpoint VR image 16 on the auxiliary image 17 to thereby generate the viewpoint superimposed image, the multi-viewpoint image generating section 43 may set the degree of transparency of the auxiliary image 17 to display the auxiliary image 17 in a semi-transparent manner, whereby the viewpoint VR image 16 hidden behind the auxiliary image 17 may be made visible through the auxiliary image 17. The degree of transparency may be set using a preset value stored in the storing unit 12, or may be set by the user U through the inputting unit 11.

Meanwhile, the pointer controlling unit 32 includes a pointer position determining section 46 and a multi-viewpoint pointer image generating section 47.

When the user instructs, through the inputting unit 11, the pointer position determining section 46 to move the pointer 18 in the X-Y plane, if the pointer 18 is in the vicinity of the viewpoint VR image 16, the pointer position determining section 46 acquires three-dimensional coordinates of a surface of the viewpoint VR image 16 on the basis of the coordinate correspondence information stored in the storing unit 12, and determines a position of the pointer 18 such that the pointer 18 is moved along the surface of the viewpoint VR image 16. Further, if the pointer 18 is in the vicinity of the auxiliary image 17, the pointer position determining section 46 determines the position of the pointer 18 such that the pointer 18 is moved along a surface of the auxiliary image 17.

The multi-viewpoint pointer image generating section 47 generates images of the pointer 18 observed at a plurality of points of view (multi-viewpoint pointer image), and gives the generated images to the multi-viewpoint image outputting unit 33 together with the position information of the pointer 18 determined by the pointer position determining section 46.

The multi-viewpoint image outputting unit 33 superimposes the viewpoint superimposed image generated by the image generating unit 31 on the viewpoint pointer images generated by the pointer controlling unit 32, to thereby generate a plurality of viewpoint images, and outputs the generated images to the glasses-free 3D display 22. The glasses-free 3D display 22 emits the plurality of viewpoint superimposed images as parallax component images in different directions, respectively.

Here, a configuration and an operation of the glasses-free 3D display 22 are briefly described.

Figure 5:
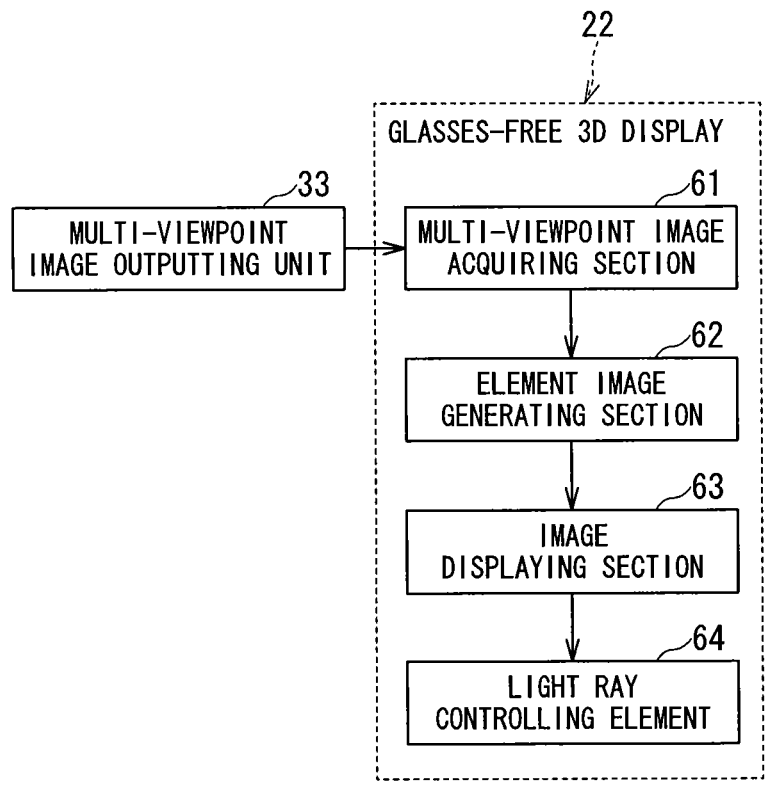
FIG. 5 is a block diagram illustrating an example of an internal configuration of the glasses-free 3D display.

FIG. 5 is a block diagram illustrating an example of an internal configuration of the glasses-free 3D display 22.

The glasses-free 3D display 22 includes a multi-viewpoint image acquiring section 61, an element image generating section 62, an image displaying section 63, and a light ray controlling element 64.

The multi-viewpoint image acquiring section 61 acquires the plurality of viewpoint images from the multi-viewpoint image outputting unit 33. The element image generating section 62 converts the plurality of viewpoint images into element images. For example, in the case where the multi-viewpoint image outputting unit 33 outputs viewpoint images at nine points of view, parallax component images are identified by parallax numbers (−4, −3, . . . , 0, . . . , 3, 4) indicating nine parallax directions corresponding to nine photographing numbers, respectively. That is, the element image generating section 62 associates each viewpoint image of the multi-viewpoint image with the corresponding parallax number to thereby handle each viewpoint image as the parallax component image, and collects the parallax component images to generate the element images.

The image displaying section 63 is configured by a display/output apparatus such as a liquid crystal display and an organic light emitting diode (OLED) display. For example, in the case of handling nine types of parallax component images, nine picture elements constitute each pixel of the image displaying section 63, and an element image is displayed for each pixel. Further, among light rays outputted by the pixels, light rays corresponding to parallax component images having the same parallax number are emitted from the plurality of pixels in parallel to each other.

The light ray controlling element 64 is configured by a plurality of exit pupils. In a two-dimensional integral imaging (II) method, a lens array and a pinhole array can be used for the light ray controlling element 64. In the lens array, segment lenses as exit pupils are arranged in a matrix pattern. In the pinhole array, pinholes as exit pupils are arranged in an array pattern. Further, in a one-dimensional II method, the light ray controlling element 64 is configured by a lenticular sheet or a slit plate. The lenticular sheet includes cylindrical lenses that are extended in the vertical direction and are arranged in the horizontal direction. The slit plate includes slits that are extended in the vertical direction and are arranged in the horizontal direction. Whichever of the lens array, the lenticular sheet, and the slit plate may be used for the light ray controlling element 64, optically, the lenses or slits function as the exit pupils of optical apertures.

The element images generated by the element image generating section 62 are displayed by the respective pixels of the image displaying section 63, and are projected onto a view region through the exit pupils, whereby a stereoscopic image is observed by the user in the view region.

Note that, in the present embodiment, description is given of an example of the case where the glasses-free 3D display 22 capable of producing stereoscopic view without glasses is used for the display apparatus, but a 3D display configured to produce stereoscopic view with special glasses may be used therefor. In general, the 3D display configured to produce stereoscopic view with special glasses respectively provides light focusing points at positions of right and left eyes of an observer at the time of observation, and focuses light from a left-eye parallax component image and a right-eye parallax component image onto the light focusing points provided at the positions corresponding to the respective eyes. In this case, the medical image processing apparatus 10 may generate a left-eye viewpoint image and a right-eye viewpoint image respectively corresponding to the left-eye parallax component image and the right-eye parallax component image, and output the generated images to the 3D display.

Further, if the viewpoint VR image 16 can be recognized by the user in the depth direction, a general display/output apparatus such as a liquid crystal display for two-dimensional display may be used. In this case, the plurality of points of view in the above description may be interpreted as one predetermined point of view.

Further, the multi-viewpoint image acquiring section 61 and the element image generating section 62 may be function implementing units that are implemented by the CPU executing predetermined programs, or may be configured by hardware logic of a circuit and the like, instead of using the CPU. Further, each function may be implemented by an appropriate combination of software and hardware.

Further, FIG. 1 illustrates an example of the case where the glasses-free 3D display 22 is provided outside of the configuration of the medical image processing apparatus 10, but the glasses-free 3D display 22 may be provided as one of the components of the medical image processing apparatus 10. Further, the medical image processing apparatus 10 may be incorporated in the modality 20.

Figure 6:
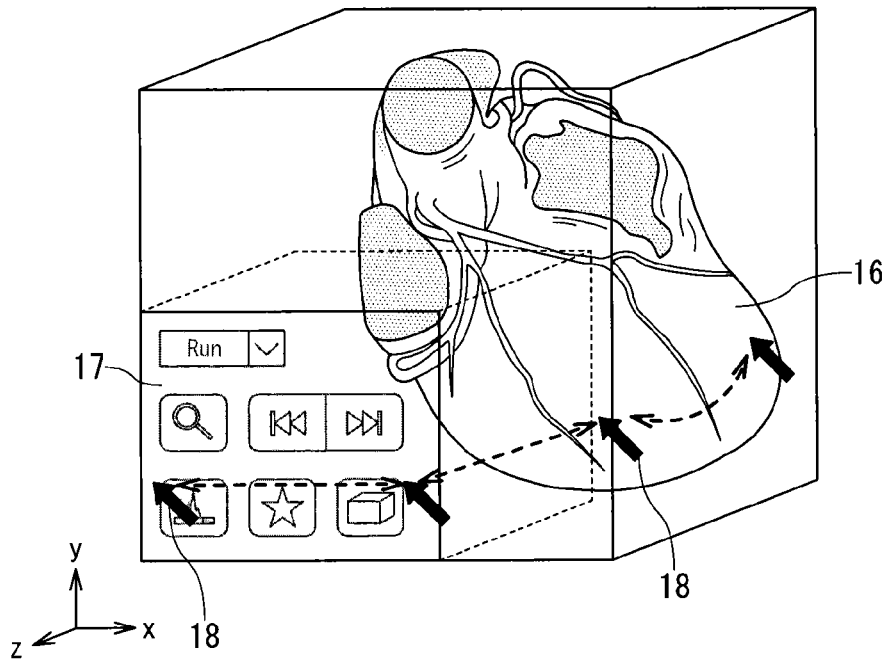
FIG. 6 is an explanatory view illustrating a first example of the state where the pointer is moved between a plurality of images that are displayed in a superimposed manner in the depth direction.

FIG. 6 is an explanatory view illustrating a first example of the state where the pointer 18 is moved between a plurality of images that are displayed in a superimposed manner in the depth direction. FIG. 6 illustrates an example of the case where the user instructs, through the inputting unit 11, the pointer 18 to move along the X axis direction.

In the example illustrated in FIG. 6, the pointer position determining section 46 determines the Z coordinate of the pointer 18 on a frontmost image of images located at the current X and Y coordinates of the pointer 18. For example, in the case where only the viewpoint VR image 16 is located at the X and Y coordinates of the pointer 18, the pointer 18 moves so as to trace along the surface of the VR image 16 (see a right side of FIG. 6). In contrast, in the case where a plurality of images (for example, the viewpoint VR image 16 and the auxiliary image 17) exist at the X and Y coordinates of the pointer 18 and where the auxiliary image 17 is the frontmost image, the pointer 18 moves so as to trace along the surface of the auxiliary image 17 (see a left side of FIG. 6).

In this case, the user instructs, through the inputting unit 11, the pointer 18 to move along the X axis direction, and thus can move the pointer 18 onto the frontmost image.

Figure 7:
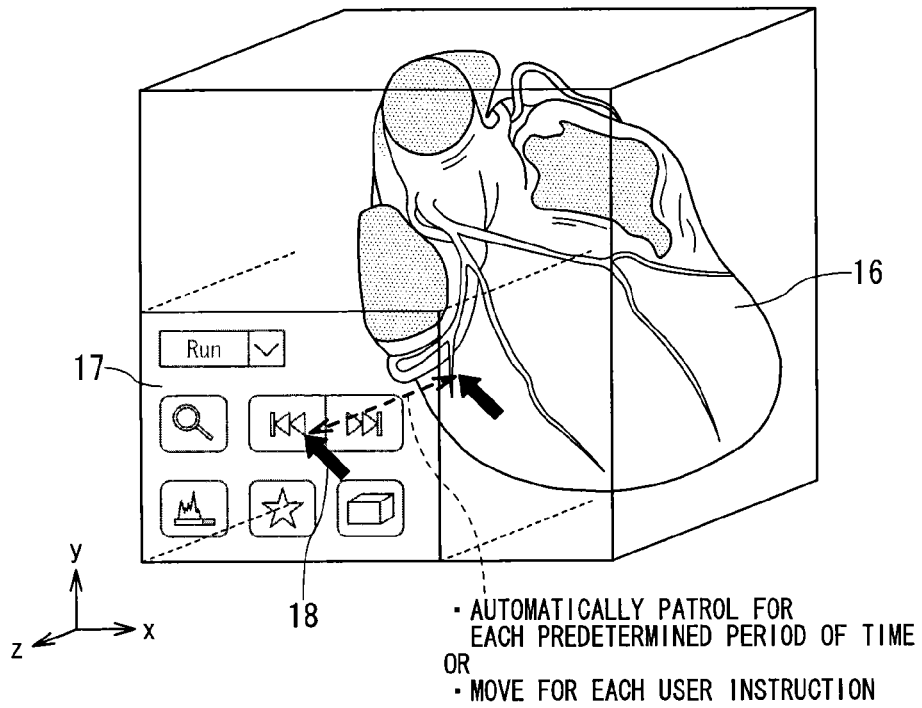
FIG. 7 is an explanatory view illustrating a second example of the state where the pointer is moved between a plurality of images that are displayed in a superimposed manner in the depth direction.

FIG. 7 is an explanatory view illustrating a second example of the state where the pointer 18 is moved between a plurality of images that are displayed in a superimposed manner in the depth direction.

In the example illustrated in FIG. 7, if the plurality of images are superimposed in the depth direction at the current X and Y coordinates, the pointer position determining section 46 determines the position in the depth direction of the pointer 18 such that the pointer 18 automatically patrols between the plurality of images while staying at each of the plurality of images for a predetermined period of time, in the state where the current X and Y coordinates of the pointer 18 are maintained. At this time, the pointer position determining section 46 may read the priority information from the storing unit 12, and then may cause the pointer 18 to patrol between the images in descending order of the degree of priority or may change the stay time at each image on the basis of the degree of priority.

For example, if a movement instruction is not given to the pointer 18 by the user through the inputting unit 11 and if the plurality of images are superimposed in the depth direction at the current X and Y coordinates, the pointer 18 automatically patrols between the images for each predetermined period of time.

In this case, because the image on which the pointer 18 is located is automatically changed, the user can perform a desired operation when the pointer 18 is located on a desired image, without the need to give an instruction through, for example, the inputting unit 11.

Alternatively, the pointer position determining section 46 may move the pointer 18 between the images each time the user performs a predetermined operation (for example, clicking of a mouse) through the inputting unit 11. The pointer position determining section 46 may determine the order of this movement on the basis of the priority information stored in the storing unit 12.

In this case, the user can move the pointer 18 onto a desired image through a simple operation.

Further, while the user does not perform any operation, the pointer position determining section 46 may read the priority information from the storing unit 12, and may cause the pointer 18 to stay on an image having the highest degree of priority. At this time, upon reception of a predetermined operation, the pointer position determining section 46 may start to move the pointer 18 between the images.

Next, description is given of a technique of enabling the user to easily understand the position in the depth direction of the pointer 18.

In the case as the examples illustrated in FIG. 6 and FIG. 7 where the pointer 18 is moved between the plurality of images superimposed in the depth direction, if the position in the depth direction of the pointer 18 can be understood from the displayed images in a visually easy manner, convenience of the user can be further improved.

Further, if the position in the depth direction of the pointer 18 can be understood from the displayed images in a visually easy manner, this is also beneficial for the case where an instruction to move the pointer 18 in the Z-axis direction can be given by an operation (for example, a wheel rotation operation of the mouse) of the user through the inputting unit 11. In this case, the pointer 18 is located at a given Z position, and hence, if at which position in the depth direction the pointer 18 is located can be visually understood, convenience of the user can be improved.

Figure 8:
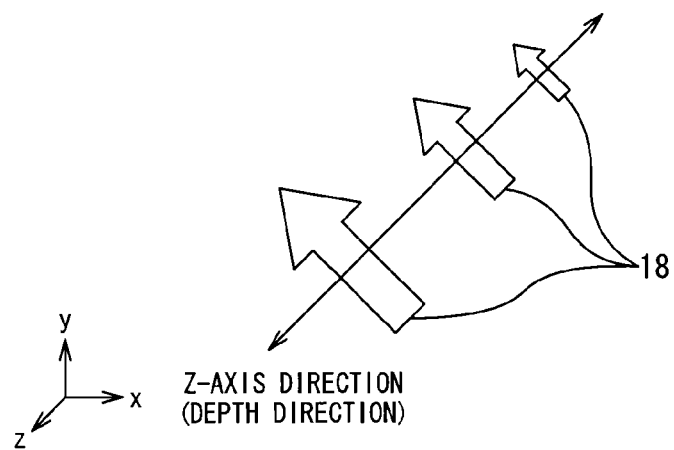
FIG. 8 is an explanatory view illustrating an example of the case where an image size of the pointer becomes larger toward the front side in the depth direction.

FIG. 8 is an explanatory view illustrating an example of the case where an image size of the pointer 18 becomes larger toward the front side in the depth direction. FIG. 8 illustrates an example of the case where the multi-viewpoint pointer image generating section 47 generates a viewpoint pointer image observed at one predetermined point of view.

As illustrated in FIG. 8, the multi-viewpoint pointer image generating section 47 generates an image of the pointer 18 in accordance with the Z coordinate of the pointer 18 such that the image size of the pointer 18 becomes larger toward the front side. The user can easily understand the position in the depth direction of the pointer 18.

Figure 9:
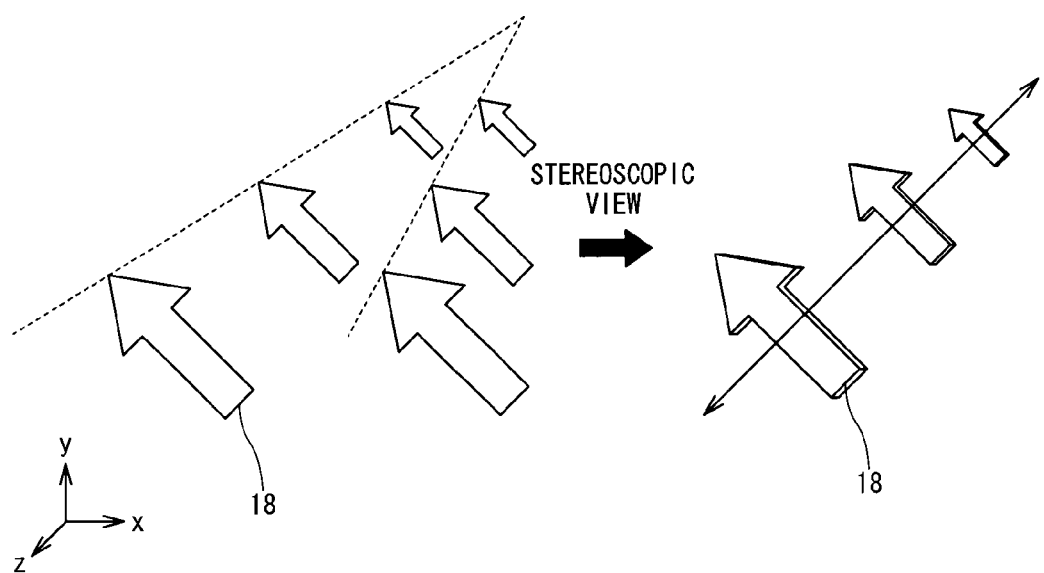
FIG. 9 is an explanatory view illustrating an example of the state where a plurality of viewpoint pointer images are generated in the case where the image size of the pointer becomes larger toward the front side in the depth direction.

FIG. 9 is an explanatory view illustrating an example of the state where a plurality of viewpoint pointer images are generated in the case where the image size of the pointer 18 becomes larger toward the front side in the depth direction.

As illustrated in FIG. 9, the multi-viewpoint pointer image generating section 47 may generate the plurality of viewpoint pointer images observed at a plurality of points of view in accordance with the Z coordinate of the pointer 18 such that the image size of the pointer 18 becomes larger toward the front side. In this case, the user can stereoscopically view the pointer 18 that is displayed so as to become larger toward the front side.

Figure 10:
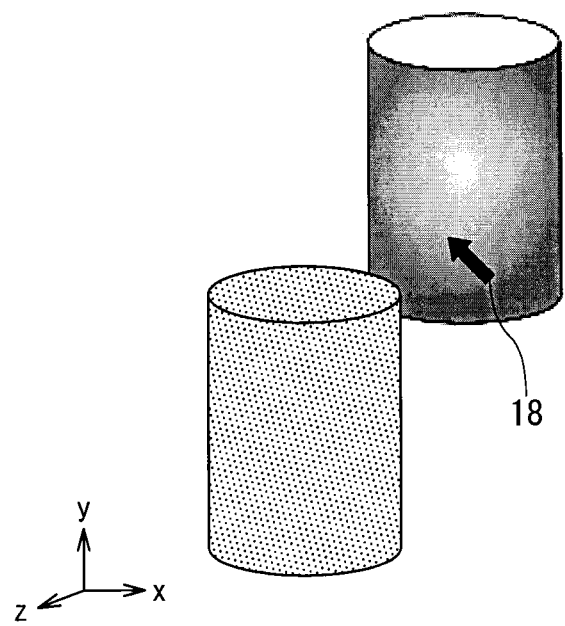
FIG. 10 is an explanatory view illustrating an example of a viewpoint image that has been subjected to a shading process with the pointer being set as a point light source.

FIG. 10 is an explanatory view illustrating an example of a viewpoint image that has been subjected to a shading process with the pointer 18 being set as a point light source.

The multi-viewpoint image generating section 43 may receive the position information of the pointer 18 from the pointer controlling unit 32 and perform a shading process on a viewpoint superimposed image with the light source being located at the position according to the position of the pointer 18. In this case, the position of the light source moves in accordance with the movement of the pointer 18. The light source can be the point light source, line light source, area light source and the like. Also, the light source can be the light source considered as the miniature bulb comprising a plurality of the point light sources distributed in a space. FIG. 10 illustrates an example of the case where the light source is placed at the position of the pointer 18. In this case of FIG. 10, an image that is on the back side of the pointer 18 and at the position closest to the pointer 18 is displayed most brightly, whereas an image that is on the front side of the pointer 18 is shaded. Naturally, shading effect is changed as the pointer 18 moves. Hence, the user can easily understand the position in the depth direction of the pointer 18 on the basis of brightness of each displayed image based on the viewpoint image.

Figure 11:
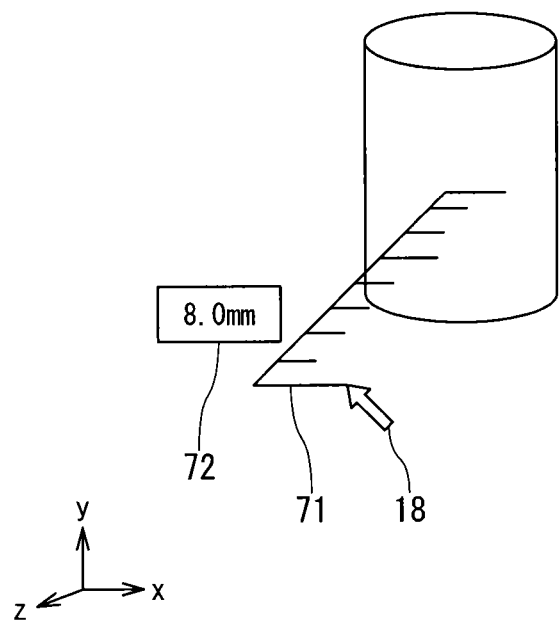
FIG. 11 is an explanatory view illustrating an example of the case where a ruler image having the pointer as its start point is superimposed on a viewpoint image.

FIG. 11 is an explanatory view illustrating an example of the case where a ruler image 71 having the pointer 18 as its start point is superimposed on a viewpoint image.

The multi-viewpoint image generating section 43 may receive the position information of the pointer 18 from the pointer controlling unit 32 and further superimpose the ruler image 71 having the pointer 18 as its start point, to thereby generate a viewpoint superimposed image. At this time, an end point of the ruler image 71 may be a surface of a target closest to the pointer, a point on its central line, and a preset point. For example, even in the case where the plurality of segmented VR images 16 are superimposed, a point on a surface of a VR image 16 having the shortest spatial distance from the pointer 18 can be set as the end point of the ruler image 71. Further, at this time, the ruler image 71 may be generated so as to become larger toward the front side in such a perspective projection manner as illustrated in FIG. 11.

Further, as illustrated in FIG. 11, the multi-viewpoint image generating section 43 may superimpose a distance value image 72 in the vicinity of the ruler image 71, the distance value image 72 indicating a distance from the pointer 18 to the end point of the ruler image 71.

In the case where the ruler image 71 and the distance value image 72 are displayed, the user can easily understand the position in the depth direction of the pointer 18 on the basis of the ruler image 71 and the distance value image 72.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A three-dimensional image processing apparatus comprising:
    a storage configured to store volume data of a target; and
    a processor configured to receive an input operation for moving a pointer and to function as an image generating unit and a pointer controlling unit, wherein
    the image generating unit generates a plurality of superimposed images at a plurality of points of view such that in each superimposed image a rendering image and a pointer image are superimposed in consideration of information of depth, the rendering image being a parallax image and being one of a plurality of viewpoint rendering images generated by performing a rendering process at the plurality of points of view on the volume data, and the pointer image being one of a plurality of viewpoint pointer images generated by observing the pointer at the plurality of points of view,
    the pointer controlling unit receives coordinates of the pointer corresponding to a first coordinate axis and a second coordinate axis from the input operation and determines coordinates of the pointer corresponding to a third coordinate axis based on the information of depth such that the pointer moves and traces along three-dimensional coordinates of a surface of the target contained in the volume data when the pointer is on the rendering image, and
    when a plurality of images are superimposed in a depth direction corresponding to the third coordinate axis at current coordinates of the pointer corresponding to the first coordinate axis and the second coordinate axis, the pointer controlling unit controls a coordinate of the pointer corresponding to the third coordinate axis such that the pointer makes rounds of the plurality of images according to a predetermined order while the coordinates of the pointer corresponding to the first coordinate axis and the second coordinate axis remain the same.

2. The three-dimensional image processing apparatus according to claim 1, wherein
    the image generating unit generates the superimposed image in which the rendering image, an auxiliary image for receiving an operation by a user, and the pointer image are superimposed in consideration of the information of the depth, and
    the pointer controlling unit obtains the coordinates of a three-dimensional position of the pointer, moves the pointer along the three-dimensional surface of the target contained in the volume data when the pointer is on the rendering image, and moves the pointer on the auxiliary image when the pointer is on the auxiliary image.

3. The three-dimensional image processing apparatus according to claim 1, wherein when the user instructs, through an inputting device, the pointer controlling unit to move the pointer on a plane corresponding to the first coordinate axis and the second coordinate axis, the pointer controlling unit sets a displayed position of the pointer such that the pointer is on a frontmost image in the direction of the depth in the superimposed image.

4. The three-dimensional image processing apparatus according to claim 1, wherein the pointer controlling unit moves the pointer such that the pointer automatically makes rounds of the plurality of images and stays at each one of the plurality of images for a predetermined period of time while the coordinates of the pointer corresponding to the first coordinate axis and the second coordinate axis remain the same.

5. The three-dimensional image processing apparatus according to claim 1, wherein
when the pointer controlling unit causes the pointer to automatically make the rounds of the plurality of images, the pointer controlling unit provides a degree of priority to each of the plurality of images, and determines a stay time at each image and a patrolling order based on the degree of priority.

6. The three-dimensional image processing apparatus according to claim 1, wherein
when a movement instruction is not given to the pointer by the user through an inputting device and when a plurality of images are superimposed in the direction of the depth at current X and Y coordinates of the pointer in an X-Y direction orthogonal to the direction of the depth, the pointer controlling unit continues to display the pointer on an image having a highest degree of priority based on a degree of priority provided to each of the plurality of images.

7. The three-dimensional image processing apparatus according to claim 6, wherein
the pointer controlling unit sequentially changes an image on which the pointer is displayed, each time the user gives an instruction through the inputting device, according to the degree of priority.

8. The three-dimensional image processing apparatus according to claim 1, wherein
the image generating unit outputs the plurality of the superimposed images to a 3D display configured to emit each of the plurality of the superimposed images as parallax component images in a direction different from one another.

9. The three-dimensional image processing apparatus according to claim 1, wherein
the pointer controlling unit generates the plurality of viewpoint pointer images each corresponding to the pointer image at the plurality of points of view, and outputs the plurality of the viewpoint pointer images to a 3D display configured to emit each of the plurality of the viewpoint pointer images as parallax component images in a direction different from one another.

10. The three-dimensional image processing apparatus according to claim 2, wherein
the image generating unit sets, to semi-transparent, a degree of transparency of an image located on a front side in the direction of the depth in the superimposed image, and generates the superimposed image.

11. The three-dimensional image processing apparatus according to claim 10, wherein
when the image generating unit receives, from the pointer controlling unit, information to an effect that the pointer is on a given image other than a frontmost image in the direction of the depth, the image generating unit sets, to semi-transparent, a degree of transparency of an image located on a position near to the frontmost image than the given image on which the pointer is displayed in the direction of the depth, and generates the superimposed image.

12. The three-dimensional image processing apparatus according to claim 2, wherein
the image generating unit generates the pointer image such that the pointer becomes larger toward the front side in the direction of the depth, and superimposes the pointer image on the superimposed image.

13. The three-dimensional image processing apparatus according to claim 2, wherein
the image generating unit receives, from the pointer controlling unit, X and Y coordinates of the pointer in the X-Y direction orthogonal to the direction of the depth and position information thereof in the direction of the depth, and performs a shading process on the superimposed image such that a light source is located at a position according to the three-dimensional position of the pointer.

14. The three-dimensional image processing apparatus according to claim 2, wherein
the image generating unit receives, from the pointer controlling unit, X and Y coordinates of the pointer in the X-Y direction orthogonal to the direction of the depth and position information thereof in the direction of the depth, further superimposes a ruler image using the three-dimensional position of the pointer as a start point thereof on the superimposed image, and generates the superimposed image.

15. The three-dimensional image processing apparatus according to claim 14, wherein
the image generating unit sets an end point of the ruler image to a point on the rendering image having a shortest spatial distance from the pointer, and displays distance information from the start point to the end point in a vicinity of the ruler image.

16. A three-dimensional image processing apparatus comprising:
a storage configured to store volume data of a target; and
a processor configured to receive an input operation for moving a pointer and to function as an image generating unit and a pointer controlling unit, wherein
the image generating unit generates a superimposed image in which a rendering image generated by performing a rendering process on the volume data and a pointer image are superimposed in consideration of information of depth, and performs a shading process on the superimposed image, the shading process including placing a light source at a position according to a three-dimensional position of the pointer, such that the light source moves as the pointer moves, and such that a portion of the superimposed image that is on a back side of the pointer and is closest to the three-dimensional position of the pointer is displayed most brightly, and a portion of the superimposed image that is on a front side of the pointer is shaded, and
the pointer controlling unit obtains information of the three-dimensional position of the pointer in the superimposed image, and moves the pointer three-dimensionally.

17. The three-dimensional image processing apparatus according to claim 16, wherein
the image generating unit generates the pointer image such that the pointer becomes larger toward the front side in a direction of the depth, and superimposes the pointer image on the superimposed image.

18. The three-dimensional image processing apparatus according to claim 16, wherein
the image generating unit receives, from the pointer controlling unit, X and Y coordinates of the pointer in the X-Y direction orthogonal to a direction of the depth and position information thereof in the direction of the depth, further superimposes a ruler image using the three-dimensional position of the pointer as a start point thereof on the superimposed image, and generates the superimposed image.

19. The three-dimensional image processing apparatus according to claim 18, wherein
the image generating unit sets an end point of the ruler image to a point on the rendering image having a shortest spatial distance from the pointer, and displays a distance information from the start point to the end point in a vicinity of the ruler image.

20. The three-dimensional image processing apparatus according to claim 16, wherein a shading of the superimposed image changes as the pointer moves.

* * * * *